R. T. SIMMONS.
COTTON CHOPPER.
APPLICATION FILED APR. 20, 1909.
959,031.
Patented May 24, 1910.
2 SHEETS—SHEET 1.
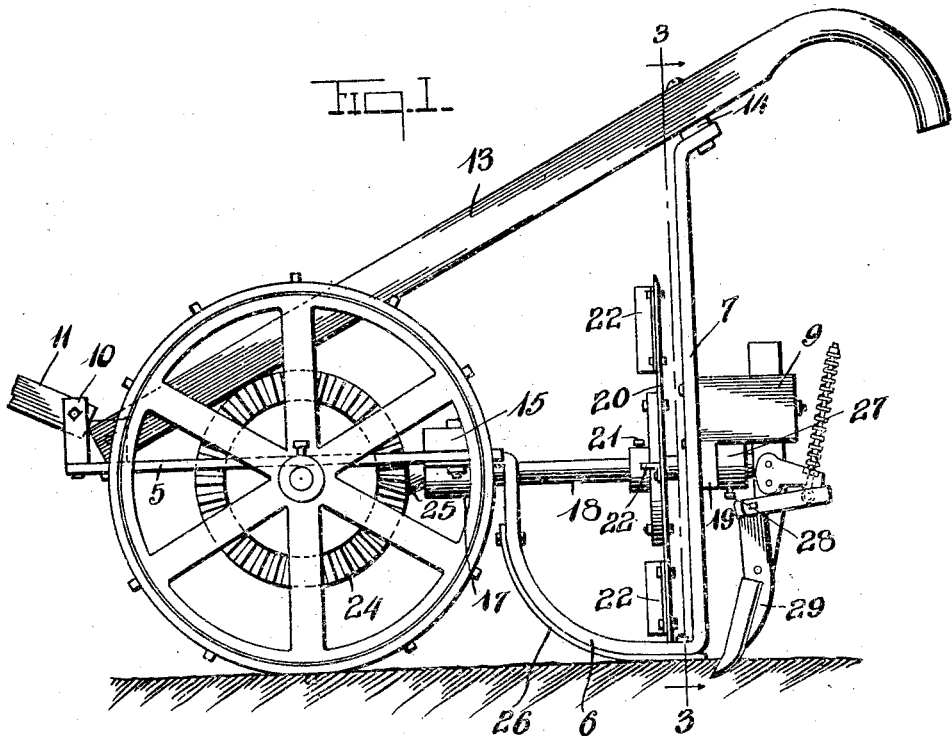
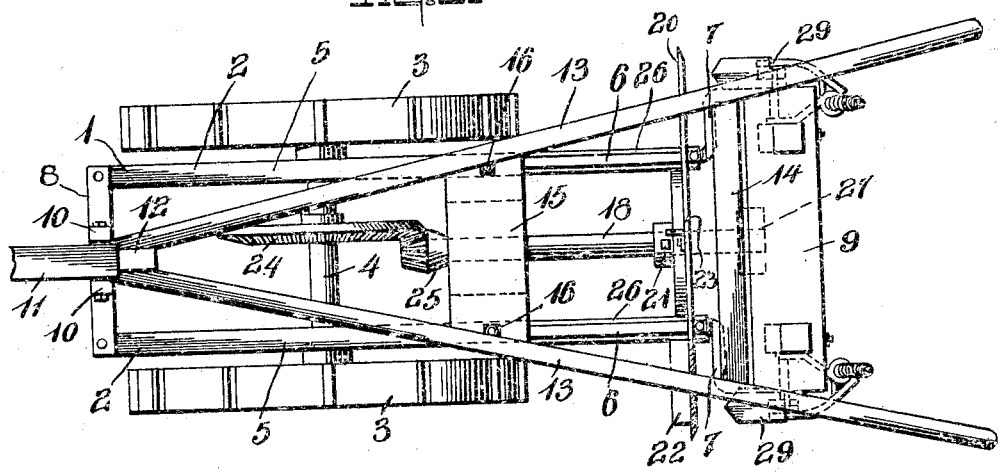
Witnesses
Inventor
Robert T. Simmons.
By John S. Duffie
Attorney R. T. SIMMONS.
COTTON CHOPPER.
APPLICATION FILED APR. 20, 1909.
959,031.
Patented May 24, 1910.
2 SHEETS—SHEET 2.
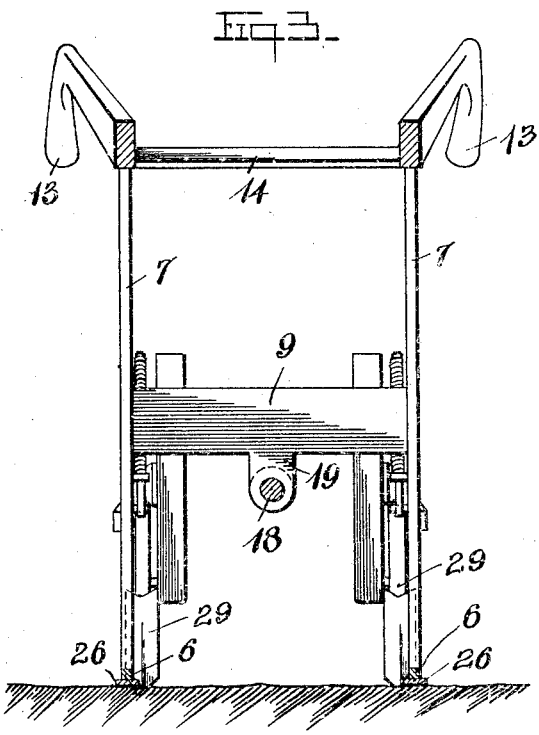
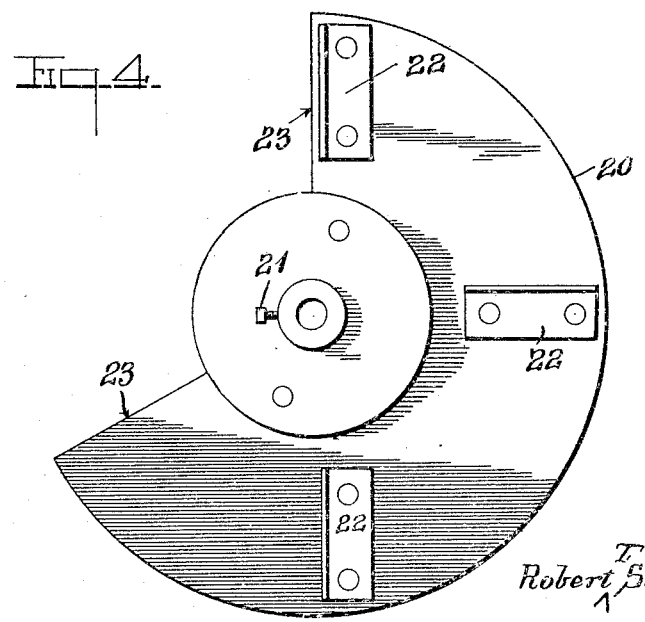
Witnesses
W. H. Rockwell
R. P. Duffie.
Inventor
Robert T. Simmons.
By John S. Duffie
Attorney

UNITED STATES PATENT OFFICE.

ROBERT TOLIVER SIMMONS, OF WYNNE, ARKANSAS.

COTTON-CHOPPER.

959,031.  Specification of Letters Patent.  Patented May 24, 1910.

Application filed April 20, 1909. Serial No. 491,087.

*To all whom it may concern:*

Be it known that I, ROBERT TOLIVER SIMMONS, a citizen of the United States, residing at Wynne, in the county of Cross and State of Arkansas, have invented certain new and useful Improvements in Cotton-Choppers, of which the following is a specification.

This invention relates to that class of devices which is generally known as "cotton choppers" and which are utilized for the purpose of removing from the rows of young plants the superfluous ones, retaining, only at suitable intervals, such plants as are intended to form the "stands." Attached to the rear end of the frame of this machine are two plow feet carrying plows of any desired construction, which are suitable for dirting the cotton immediately after the revolving disk cutter or hoe has blocked it out. On the inner side of each plow and removably secured to the rear end of the frame of the machine are fenders (not shown) to prevent the dirt or clods from mashing down or covering up the young plants of cotton.

The objects of the invention are to produce a machine of this character that may be easily operated, is simple in construction, and inexpensive as to cost.

A further object of my device is to produce a machine capable of doing a maximum amount of work and, at the same time, serve all the functions of any of the more complicated machines of this nature.

In the drawings I have illustrated a simple and preferred form of the invention, it being however, understood that no limitation is made as to the precise structural details illustrated therein, but that changes, alterations and modifications within the scope of the appended claims may be resorted to at will.

In the drawings: Figure 1 is a side elevation of my invention. Fig. 2 is a top plan view of my device. Fig. 3 is a vertical transverse section taken on the line 3—3 of Fig. 1, looking rearwardly. Fig. 4 is a face view of the disk wheel employed.

My invention is described as follows: The frame 1 consisting of the similar runners 2, is mounted upon the wheels 3 by means of the transverse shaft 4 whereon said wheels are keyed. Each of said runners has a straight portion 5, a downwardly, rearwardly curved portion 6 and a substantially vertical portion 7. Said runners are connected at their forward ends by means of the casting 8. The straight portions 5 of said runners are supported centrally by means of said shaft 4, they being supported rearwardly by means of the cross piece 9. Lugs 10 are formed to said casting 8 and extend vertically. They are the means whereby a tongue 11 is pivotally connected to said casting. Connected to the rearward extension 12 are the handles 13 reinforced by the brace 14 whereto the upper ends of said straight portions 7 of said rails 2 are secured. Secured to the rear ends of the straight portions 5 of said runners is the transverse beam 15 held thereto by means of nut and bolt connections 16, or other suitable connecting means. Formed to the lower face of said beam 15 is a bearing 17 wherein is journaled the longitudinal shaft 18, which is journaled in the bearing 19 of said cross piece 9. The disk wheel 20 is held to said shaft 18 by means of the set screw 21. A plurality of small knives 22 are removably secured in space relation to the front face of said disk. One or more gaps 23 of whatever dimensions required are cut in said disk. The space between the cotton will be governed by the size of the gap or gaps cut in said disk wheel. The number of stalks cut from the row will be determined by the number of revolutions made by said shaft 18 to each revolution of the large beveled gear wheel 24 keyed to said shaft 4, the teeth of which intermesh with the teeth of the small beveled gear 25 held to the foremost end of said shaft 18. One of the functions of said runners, it will be noted, is to serve as a guide to prevent the disk or knives from cutting too deep. Secured to the under faces of the curved portion 6 of said runners are the reinforcing members 26, which will be bolted on to the runners and serve to make the machine run steady. They also serve as a brace and protection to the runners preventing them from wearing and becoming weakened. A collar 27 is held to said shaft 18 by means of a set screw 28 and serves to hold said shaft against forward movement, thus enabling the shaft 18 to act as a brace to the entire machine.

The plow feet 29 are held by the cross piece 9 in any substantial manner, the preferred means, however, being illustrated in the drawings.

What I claim as new and desire to secure by Letters Patent is:

1. In a cotton chopper a disk wheel, a plurality of knives, each consisting of a right-angular piece of metal removably secured to one of the faces of the wheel in spaced relation to each other, said disk having cut therein a gap of suitable dimensions, substantially as described.

2. In a cotton chopper comprising a longitudinal shaft, a disk wheel adjustably secured to said shaft, said disk wheel provided with a plurality of knives, and having a gap cut therein, each of said knives composed of a right-angular piece of metal secured to one of the faces of the disk wheel.

In testimony whereof I affix my signature, in presence of two witnesses.

ROBERT TOLIVER SIMMONS.

Witnesses:
E. H. LEGG,
M. FEIST.